United States Patent
Eranpurwala et al.

(10) Patent No.: US 11,960,904 B2
(45) Date of Patent: Apr. 16, 2024

(54) UTILIZING MACHINE LEARNING MODELS TO PREDICT SYSTEM EVENTS BASED ON TIME SERIES DATA GENERATED BY A SYSTEM

(71) Applicant: Accenture Global Solutions Limited, Dublin (IE)

(72) Inventors: Femida Eranpurwala, Navi Mumbai (IN); Satyan Kumar, Alpharetta, GA (US); Rahul Maheshwari, Schaumburg, IL (US); Balaji Poonkundran, Electronic (IN)

(73) Assignee: Accenture Global Solutions Limited, Dublin (IE)

( * ) Notice: Subject to any disclaimer, the term of this patent is extended or adjusted under 35 U.S.C. 154(b) by 214 days.

(21) Appl. No.: 17/568,282

(22) Filed: Jan. 4, 2022

(65) Prior Publication Data
US 2023/0185579 A1   Jun. 15, 2023

(30) Foreign Application Priority Data
Nov. 22, 2021   (IN) .............................. 202141053577

(51) Int. Cl.
*G06F 15/177* (2006.01)
*G06F 9/4401* (2018.01)
*G06F 18/214* (2023.01)
*G06N 20/00* (2019.01)

(52) U.S. Cl.
CPC .......... *G06F 9/4411* (2013.01); *G06F 9/4403* (2013.01); *G06F 18/214* (2023.01); *G06N 20/00* (2019.01); *G06F 9/4401* (2013.01)

(58) Field of Classification Search
CPC .... G06F 9/4411; G06F 9/4403; G06F 18/214; G06F 8/70; G06F 2218/10; G06N 20/00; G06N 3/08; G06N 7/01; G06N 20/10; G06N 20/20
USPC ............................................................ 713/2
See application file for complete search history.

(56) References Cited

U.S. PATENT DOCUMENTS

| | | | |
|---|---|---|---|
| 10,019,559 B2* | 7/2018 | Gehring ................. | G06Q 10/06 |
| 10,346,774 B2* | 7/2019 | Martinez .............. | G06Q 10/063 |
| 11,734,614 B1* | 8/2023 | Wang .................... | G06N 3/045 |
| | | | 706/12 |
| 2005/0288993 A1* | 12/2005 | Weng .................... | G06Q 10/06 |
| | | | 705/7.31 |
| 2011/0077989 A1* | 3/2011 | Akred ................... | G06Q 10/06 |
| | | | 705/7.38 |
| 2018/0268304 A1* | 9/2018 | Manadhata ............. | G06N 5/04 |

(Continued)

*Primary Examiner* — Volvick Derose
(74) *Attorney, Agent, or Firm* — Harrity & Harrity, LLP

(57) ABSTRACT

A device may receive historic temporal data identifying events associated with a system, and may perform block bootstrapping of the hierarchical time series data, based on a hyperparameters, to generate blocks of data points of the historic time series data. The device may process the blocks of data points, with a plurality of different machine learning models, to calculate predictions, and may apply weights to the predictions to generate weighted predictions. The device may aggregate the weighted predictions to generate aggregated predictions, and may apply final weights to the aggregated predictions to generate weighted aggregated predictions. The device may aggregate the weighted aggregated predictions to generate a final prediction, and may perform one or more actions based on the final prediction.

20 Claims, 10 Drawing Sheets

(56) References Cited

U.S. PATENT DOCUMENTS

| | | | |
|---|---|---|---|
| 2019/0325354 A1* | 10/2019 | Rajnayak | G06F 18/2413 |
| 2019/0339688 A1* | 11/2019 | Cella | H04L 1/18 |
| 2020/0319877 A1* | 10/2020 | Glazer | G06F 9/44505 |
| 2021/0271934 A1* | 9/2021 | White | G06V 10/774 |
| 2022/0012641 A1* | 1/2022 | Iyengar | G06F 18/22 |
| 2022/0076164 A1* | 3/2022 | Conort | G06N 20/00 |
| 2022/0092406 A1* | 3/2022 | Amad | G06N 3/045 |
| 2022/0103444 A1* | 3/2022 | Ranjan | H04L 43/106 |
| 2022/0277201 A1* | 9/2022 | Purica | G06N 3/045 |
| 2022/0292008 A1* | 9/2022 | Kavali | G06N 3/091 |
| 2023/0012177 A1* | 1/2023 | Ghalyan | G06F 18/2193 |
| 2023/0089081 A1* | 3/2023 | Hovila | G01R 31/085 |
| 2023/0128579 A1* | 4/2023 | Resnick | G06N 20/20 |
| | | | 706/21 |
| 2023/0185882 A1* | 6/2023 | Tian | G06F 18/2193 |
| | | | 382/159 |

* cited by examiner

UTILIZING MACHINE LEARNING MODELS TO PREDICT SYSTEM EVENTS BASED ON TIME SERIES DATA GENERATED BY A SYSTEM

CROSS-REFERENCE TO RELATED APPLICATION

This application claims priority to Indian Application No. 202141053577 entitled "UTILIZING MACHINE LEARNING MODELS TO PREDICT SYSTEM EVENTS BASED ON TIME SERIES DATA GENERATED BY A SYSTEM," filed on Nov. 22, 2021. The entire content of which is expressly incorporated herein by reference.

BACKGROUND

A service or a process may be provided by a system that predicts events (e.g., outages a time period in advance of the outages) for one or more resources (e.g., servers, applications, and/or the like) and one or more infrastructure components (e.g., databases, processors, memories, and/or the like).

SUMMARY

Some implementations described herein relate to a method. The method may include receiving historic time series data identifying events associated with a system, and performing block bootstrapping of the historic time series data, based on a parameter, to generate blocks of data points of the historic time series data. The method may include processing the blocks of data points, with three machine learning models, to calculate predictions. These predictions are compared against each other and weights are assigned to all the three machine learning models based on their performance. The method may include aggregating the weighted first predictions to generate an aggregated first prediction, and processing the blocks of data points, with second machine learning models, to calculate second predictions. The method may include applying second weights to the second predictions to generate weighted second predictions, and aggregating the weighted second predictions to generate an aggregated second prediction. The method may include processing the blocks of data points, with third machine learning models, to calculate third predictions, and applying third weights to the third predictions to generate weighted third predictions. The method may include aggregating the weighted third predictions to generate an aggregated third prediction, and applying final weights to the aggregated first prediction, the aggregated second prediction, and the aggregated third prediction to generate weighted aggregated predictions. The method may include aggregating the weighted aggregated predictions to generate a final prediction, and performing one or more actions based on the final prediction.

Some implementations described herein relate to a device. The device may include one or more memories and one or more processors coupled to the one or more memories. The one or more processors may be configured to perform block bootstrapping of historic time series data associated with a system, based on a parameter, to generate blocks of data points of the historic time series data, and process the blocks of data points, with first machine learning models, to calculate first predictions. The one or more processors may be configured to apply first weights to the first predictions to generate weighted first predictions, and aggregate the weighted first predictions to generate an aggregated first prediction. The one or more processors may be configured to process the blocks of data points, with second machine learning models, to calculate second predictions, and apply second weights to the second predictions to generate weighted second predictions. The one or more processors may be configured to aggregate the weighted second predictions to generate an aggregated second prediction, and apply final weights to the aggregated first prediction and the aggregated second prediction to generate weighted aggregated predictions. The one or more processors may be configured to aggregate the weighted aggregated predictions to generate a final prediction, and perform one or more actions based on the final prediction.

Some implementations described herein relate to a non-transitory computer-readable medium that stores a set of instructions for a device. The set of instructions, when executed by one or more processors of the device, may cause the device to receive historic time series data identifying events associated with a system, and perform block bootstrapping of the historic time series data, based on a parameter, to generate blocks of data points of the historic time series data. The set of instructions, when executed by one or more processors of the device, may cause the device to process the blocks of data points, with first machine learning models, to calculate first predictions, and apply first weights to the first predictions to generate weighted first predictions. The set of instructions, when executed by one or more processors of the device, may cause the device to aggregate the weighted first predictions to generate an aggregated first prediction, and process the blocks of data points, with second machine learning models, to calculate second predictions. The set of instructions, when executed by one or more processors of the device, may cause the device to apply second weights to the second predictions to generate weighted second predictions, and aggregate the weighted second predictions to generate an aggregated second prediction. The set of instructions, when executed by one or more processors of the device, may cause the device to process the blocks of data points, with third machine learning models, to calculate third predictions, and apply third weights to the third predictions to generate weighted third predictions. The set of instructions, when executed by one or more processors of the device, may cause the device to aggregate the weighted third predictions to generate an aggregated third prediction, and apply final weights to the aggregated first prediction, the aggregated second prediction, and the aggregated third prediction to generate weighted aggregated predictions. The set of instructions, when executed by one or more processors of the device, may cause the device to aggregate the weighted aggregated predictions to generate a final prediction, and perform one or more actions based on the final prediction.

DETAILED DESCRIPTION

Figure 1A:
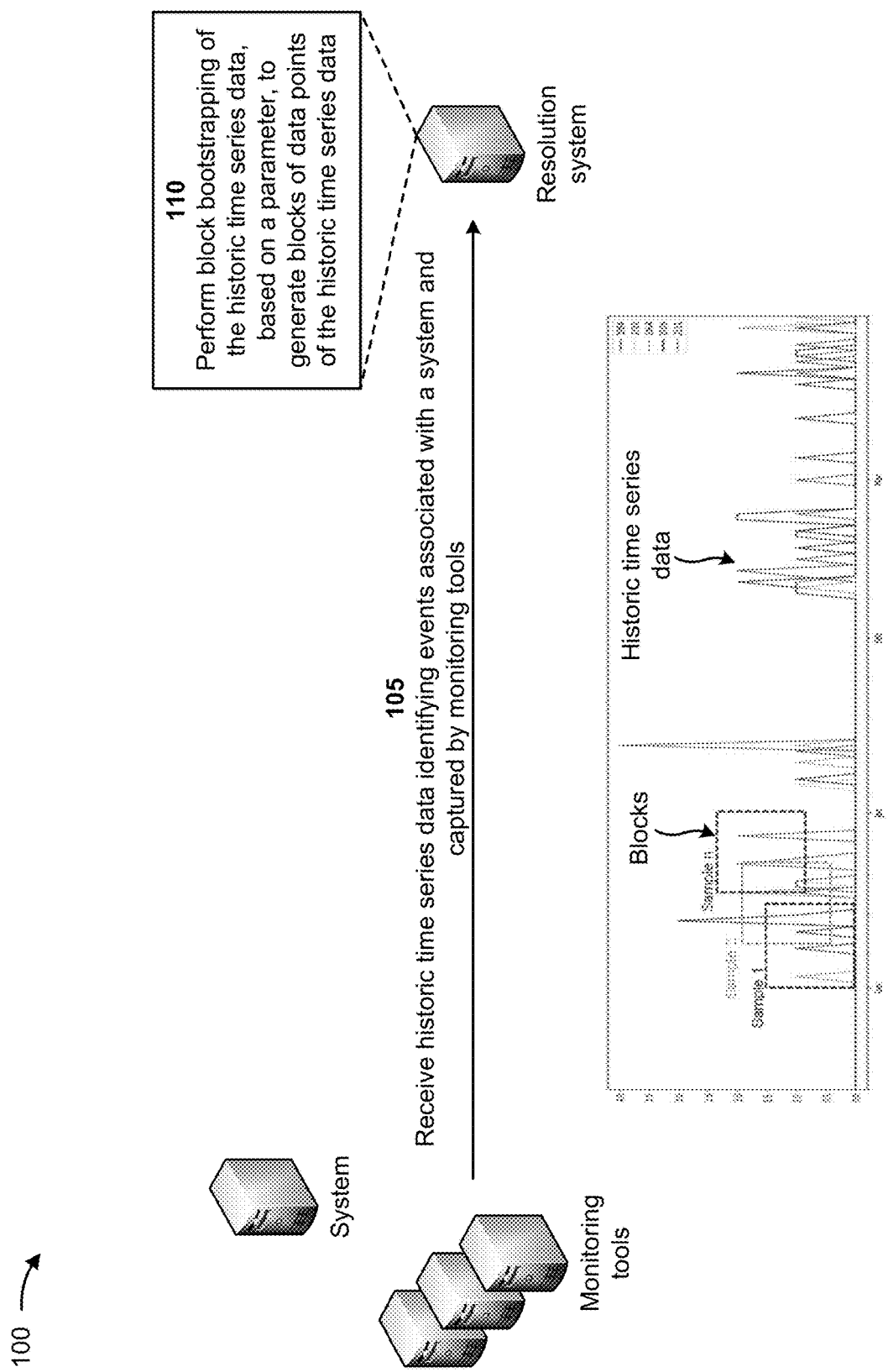
FIGS. 1A-1F are diagrams of an example implementation described herein.

The following detailed description of example implementations refers to the accompanying drawings. The same reference numbers in different drawings may identify the same or similar elements.

A monitoring tool may monitor data generated by a system. The data may include time series data identifying events (e.g., outages, alarms, flags, and/or the like) associated with the system and captured by the monitoring tool. However, current techniques for predicting problems associated with data generated by a system are unable to predict problems between the resources and the infrastructure components of a system (e.g., a location of a problem, such as with a server, a file, an application, a database, and/or the like). Current techniques utilize single time series data associated with a single infrastructure component and fail to identify complex and hidden intercomponent relationships. For example, conventional techniques may support the use of one of a first time series window for monitoring short term (e.g., hourly, daily, etc.) trends or a second, longer, window for monitoring long term trends (e.g., monthly, quarterly, etc.). The infrastructure components of the system generate specific historic data trends, seasonality, and hidden data patterns for critical events, based on a selected time series window, which creates prediction uncertainty at larger scale. Current techniques are also unable to predict critical events since critical events are rare, unique in nature, and vary for each infrastructure component.

Therefore, current techniques for predicting problems associated with data generated by a system consume computing resources (e.g., processing resources, memory resources, communication resources, and/or the like), networking resources, and/or the like while failing to identify problems associated with complex and hidden intercomponent relationships and/or critical events, servicing system failure caused by the complex and hidden intercomponent relationships and/or the critical events, failing to provide a provide a product or a service by the system due to the complex and hidden intercomponent relationships and/or the critical events, and/or the like.

Some implementations described herein relate to a resolution system that utilizes machine learning models to predict system events based on time series data generated by a system. For example, the resolution system may receive historic temporal data and process the historical temporal data through hierarchical time series identifying events associated with a system, and may perform block bootstrapping of the historic time series data, based on a parameter (e.g., a first hyperparameter), to generate blocks of data points of the historic time series data. The resolution system may process the blocks of data points, with first machine learning models, to calculate first predictions, and may apply first weights (e.g., second hyperparameters) to the first predictions to generate weighted first predictions. The resolution system may aggregate the weighted first predictions to generate an aggregated first prediction (e.g., via bagging of trained hierarchical time series models), and may process the blocks of data points, with second machine learning models, to calculate second predictions. The resolution system may apply second weights (e.g., second hyperparameters) to the second predictions to generate weighted second predictions, and may aggregate the weighted second predictions to generate an aggregated second prediction (e.g., via bagging of trained hierarchical time series models). The resolution system may process the blocks of data points, with third machine learning models, to calculate third predictions, and may apply third weights (e.g., second hyperparameters) to the third predictions to generate weighted third predictions. The resolution system may aggregate the weighted third predictions to generate an aggregated third prediction (e.g., via bagging of trained hierarchical time series models), and may apply final weights (e.g., third hyperparameters) to the aggregated first prediction, the aggregated second prediction, and the aggregated third prediction to generate weighted aggregated predictions. The resolution system may aggregate the weighted aggregated predictions to generate a final prediction (e.g., via bagging of trained hierarchical time series models), and may perform one or more actions based on the final prediction.

In this way, the resolution system utilizes machine learning models to predict system events (e.g., various types of infrastructural outages based on time series data generated by a system. The resolution system may resolve system problems (e.g., inevitable outages) by utilizing correlation and machine learning models to recognize (e.g., in real time or near-real time) complex and hidden intercomponent relationships and/or critical events associated with infrastructure components of the system. The resolution system may identify critical events by analyzing different resources and/or infrastructure components of the system, and may forecast and prevent system outages. This, in turn, conserves computing resources, networking resources, and/or the like that would otherwise have been consumed in failing to identify problems associated with complex and hidden intercomponent relationships and/or critical events, servicing system failure caused by the complex and hidden intercomponent relationships and/or the critical events, failing to provide a provide a product or a service by the system due to the complex and hidden intercomponent relationships and/or the critical events, and/or the like.

FIGS. 1A-1F are diagrams of an example 100 associated with utilizing machine learning models to predict system events based on time series data generated by a system. As shown in FIGS. 1A-1F, example 100 includes a system, multiple monitoring tools, and a resolution system. The system and each of the monitoring tools may include an application server, a client server, a web server, a database server, a host server, a proxy server, a virtual server, or a server in a cloud computing system. The resolution system may include a system that utilizes machine learning models to predict system events (e.g., outages) based on time series data generated by a system. Further details of the target systems and the resolution system are provided elsewhere herein.

As shown in FIG. 1A, and by reference number 105, the resolution system may receive, from the monitoring tools, historic time series data identifying events associated with a system and captured by monitoring tools. For example, one or more of the monitoring tools may monitor and capture data generated by the system over a time period (e.g., a week, a month, a year, and/or the like), and may provide the data (e.g., the historic time series data) to the resolution system. The resolution system may continuously receive the historic time series data from the monitoring tools, may periodically receive the historic time series data from the monitoring tools, may automatically receive the historic time series data from the monitoring tools, may receive the historic time series data from the monitoring tools based on requesting the historic time series data, and/or the like.

The historic time series data may include univariate time series data identifying events (e.g., outages, alarms, flags, and/or the like) associated with the system. Univariate time series data may be a time series that includes single (e.g., scalar) data points (e.g., observations, such as events) recorded sequentially over equal time increments. For example, if there is no outage during one or more time increments, data points for those time increments may be zero. If there is an outage during one or more time increments, data points for those time increments may include a value indicative of the outage (e.g., other than zero). An outage may be caused by a server, a file, an application, a database, and/or the like of the system.

As further shown in FIG. 1A, and by reference number 110, the resolution system may perform block bootstrapping of the historic time series data, based on a parameter, to generate blocks of data points of the historic time series data. For example, block bootstrapping may include the resolution system dividing the historic time series data into the blocks of data points of the historic time series data. Each of the blocks of data points may include the same quantity of data points. The parameter (e.g., a "num" parameter) may define a quantity of data points to be included in each of the blocks of data points of the historic time series data. The parameter may be initially set by the resolution system and may be modified over time by the resolution system. For example, the resolution system may receive feedback associated with a prediction generated by the resolution system (e.g., as described below), and may modify the parameter based on the feedback. In some implementations, when modifying the parameter, the resolution system may increase the parameter to increase the quantity of data points to be included in each of the blocks of data points or may decrease the parameter to decrease quantity of data points to be included in each of the blocks of data points.

Figure 1B:
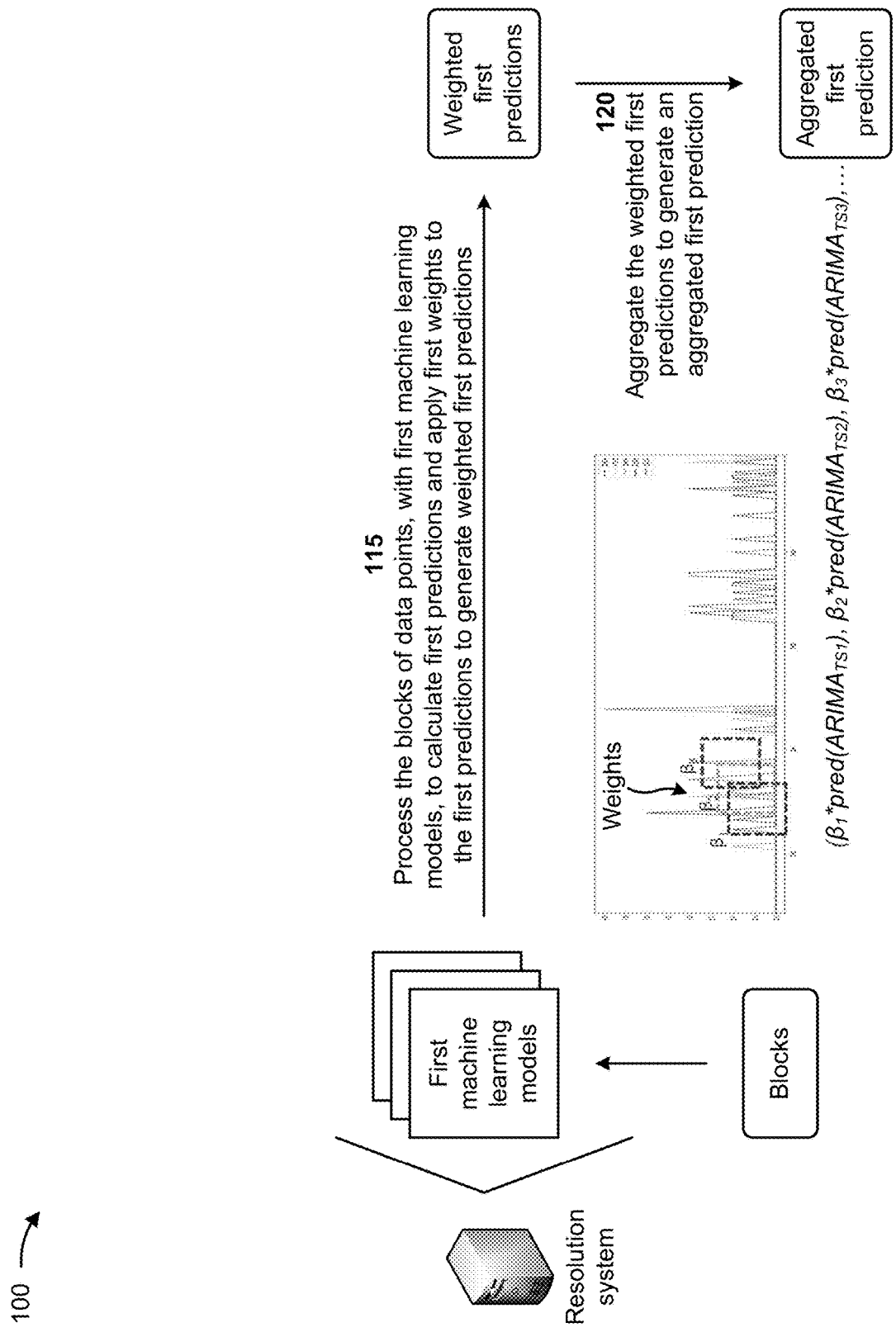

As shown in FIG. 1B, and by reference number 115, the resolution system may process the blocks of data points, with first machine learning models, to calculate first predictions and may apply first weights to the first predictions to generate weighted first predictions. For example, a plurality of first machine learning models may be utilized by the resolution system and may process the blocks of data points to calculate the first predictions. Each of the first machine learning models may include an autoregressive integrated moving average (ARIMA) model, a seasonal ARIMA (SARIMA) model, a Holt-Winters seasonal (HW) model, and/or the like. In some implementations, one or more of the first machine learning models may include different prediction capabilities for calculating the first predictions. Each of the first predictions may include a prediction of a future event (e.g., an outage, an alarm, a flag, and/or the like) associated with the system. The ARIMA model is a generalization of an autoregressive moving average (ARMA) model, and may be fitted to time series data either to better understand the data or to predict future points in the time series (e.g., forecasting). The SARIMA model is one step different from an ARIMA model based on the concept of seasonal trends. In many time series data, frequent seasonal effects come into play. For example, for an average temperature measured in a location with four seasons, there will be a seasonal effect on a yearly basis. The HW model is a seasonal model that includes a forecast model and three smoothing models (e.g., one for a level, one for a trend, and one for a seasonal component), with corresponding smoothing parameters.

When applying the first weights (e.g., $\beta_1$, $\beta_2$, $\beta_3$, . . . values) to the first predictions (e.g., pred(ARIMA$_1$), pred(ARIMA$_2$), pred(ARIMA$_3$), . . . ) to generate the weighted first predictions, the resolution system may multiply the first weights and the first predictions to generate the weighted first predictions as follows:

$$\beta_1*\text{pred}(\text{ARIMA}_1), \beta_2*\text{pred}(\text{ARIMA}_2), \beta_3*\text{pred}(\text{ARIMA}_3),$$

The first weights applied to the first predictions may include different weights that are based on the different prediction capabilities of the first machine learning models. For example, the resolution system may apply a highest first weight to one of the first machine learning models with a highest prediction capability, may apply a next highest first weight to another one of the first machine learning models with a next highest prediction capability, and/or the like, to generate the weighted first predictions. The resolution system may determine the first weights based on statistical measurements of the first machine learning models and/or based on comparing predictions of the first machine learning models with actual events (e.g., outages). In some implementations, when applying the first weights to the first predictions to generate the weighted first predictions, the resolution system may apply the first weights to the first predictions, based on the prediction capabilities of the first machine learning models, to generate the weighted first predictions.

As further shown in FIG. 1B, and by reference number 120, the resolution system may aggregate the weighted first predictions to generate an aggregated first prediction. For example, when aggregating the weighted first predictions (e.g., $\beta_1*\text{pred}(\text{ARIMA}_1)$, $\beta_2*\text{pred}(\text{ARIMA}_2)$, $\beta_3*\text{pred}(\text{ARIMA}_3)$, . . . ) to generate the aggregated first prediction (e.g., pred(ARIMA)), the resolution system may add the weighted first predictions together to generate the aggregated first prediction, as follows:

$$\text{pred}(\text{ARIMA})=\Sigma(\beta_1*\text{pred}(\text{ARIMA}_1), \beta_2*\text{pred}(\text{ARIMA}_2), \beta_3*\text{pred}(\text{ARIMA}_3), \ldots ).$$

In some implementations, the resolution system may determine an average of the weighted first predictions as the aggregated first prediction. In such implementations, the resolution system may add the weighted first predictions together to generate a value and may divide the value by a quantity of the weighted first predictions to determine the average of the weighted first predictions.

Figure 1C:
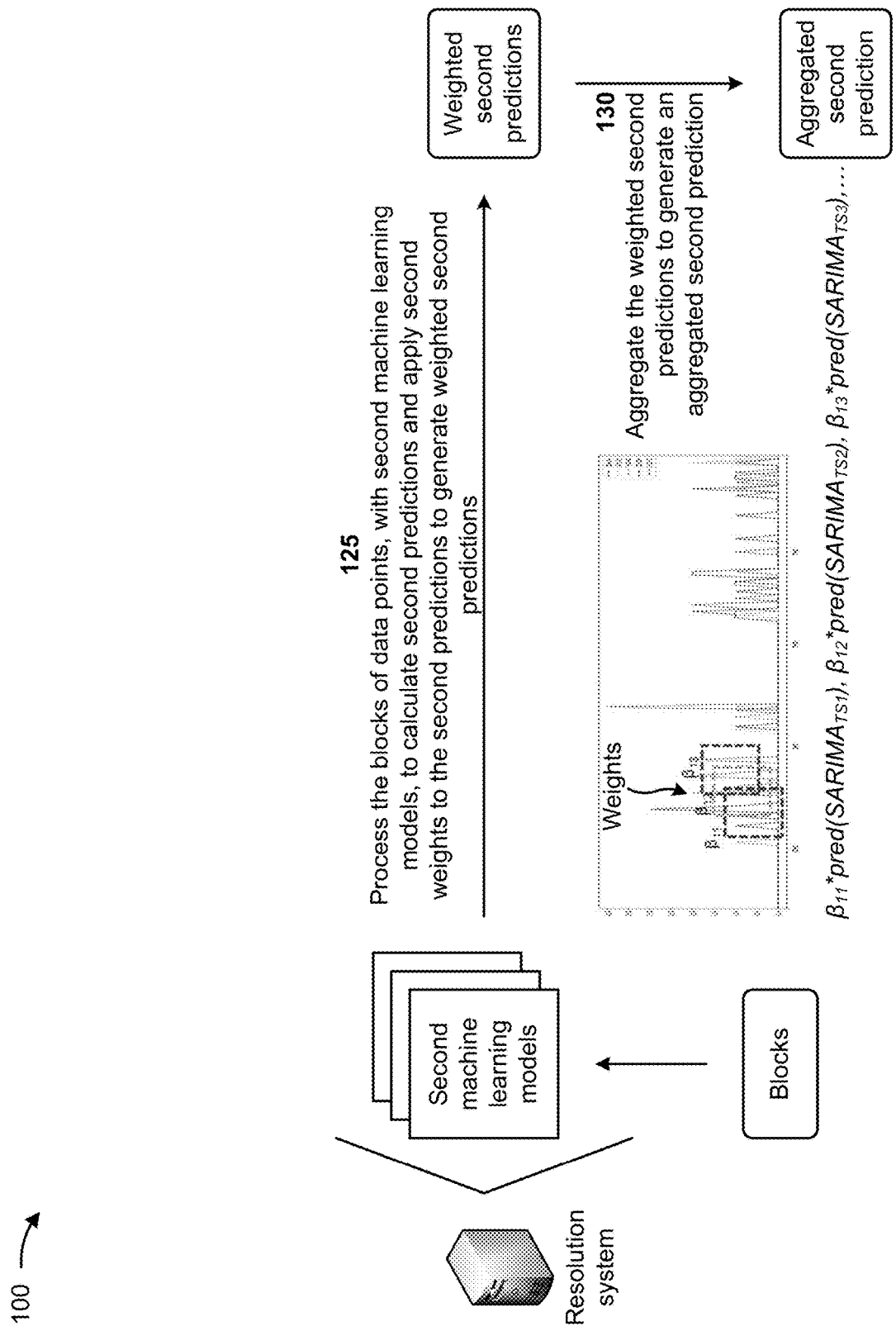

As shown in FIG. 1C, and by reference number 125, the resolution system may process the blocks of data points, with second machine learning models, to calculate second predictions and may apply second weights to the second predictions to generate weighted second predictions. For example, a plurality of second machine learning models (e.g., different from the first machine learning models) may be utilized by the resolution system and may process the blocks of data points to calculate the second predictions. For example, if the first machine learning model is ARIMA model, the second machine learning model may be a SARIMA model or an HW model. In some implementations, one or more of the second machine learning models may include different prediction capabilities for calculating the second predictions. Each of the second predictions may include a prediction of a future event (e.g., an outage, an alarm, a flag, and/or the like) associated with the system.

When applying the second weights (e.g., $\beta_{11}$, $\beta_{12}$, $\beta_{13}$, . . . values) to the second predictions (e.g., pred(SARIMA$_1$), pred(SARIMA$_2$), pred(SARIMA$_3$), . . . ) to generate the weighted second predictions, the resolution system may multiply the second weights and the second predictions to generate the weighted second predictions as follows:

$\beta_{11}*\text{pred}(\text{SARIMA}_1), \beta_{12}*\text{pred}(\text{SARIMA}_2),$
$\beta_{13}*\text{pred}(\text{SARIMA}_3),$ The second weights applied to the second predictions may include different weights that are based on the different prediction capabilities of the second machine learning models. For example, the resolution system may apply a highest second weight to one of the second machine learning models with a highest prediction capability, may apply a next highest second weight to another one of the second machine learning models with a next highest prediction capability, and/or the like, to generate the weighted second predictions. The resolution system may determine the second weights based on statistical measurements of the second machine learning models and/or based on comparing predictions of the second machine learning models with actual events (e.g., outages). In some implementations, when applying the second weights to the second predictions to generate the weighted second predictions, the resolution system may apply the second weights to the second predictions, based on the prediction capabilities of the second machine learning models, to generate the weighted second predictions.

As further shown in FIG. 1C, and by reference number 130, the resolution system may aggregate the weighted second predictions to generate an aggregated second prediction. For example, when aggregating the weighted second predictions (e.g., $\beta_{11}*\text{pred}(\text{SARIMA}_1), \beta_{12}*\text{pred}(\text{SARIMA}_2), \beta_{13}*\text{pred}(\text{SARIMA}_3), \ldots$) to generate the aggregated second prediction (e.g., pred(SARIMA)), the resolution system may add the weighted second predictions together to generate the aggregated second prediction, as follows:

$$\text{pred}(\text{SARIMA})=\Sigma(\beta_{11}*\text{pred}(\text{SARIMA}_1), \beta_{12}*\text{pred}(\text{SARIMA}_2), \beta_{13}*\text{pred}(\text{SARIMA}_3), \ldots).$$

In some implementations, the resolution system may determine an average of the weighted second predictions as the aggregated second prediction. In such implementations, the resolution system may add the weighted second predictions together to generate a value and may divide the value by a quantity of the weighted second predictions to determine the average of the weighted second predictions.

Figure 1D:
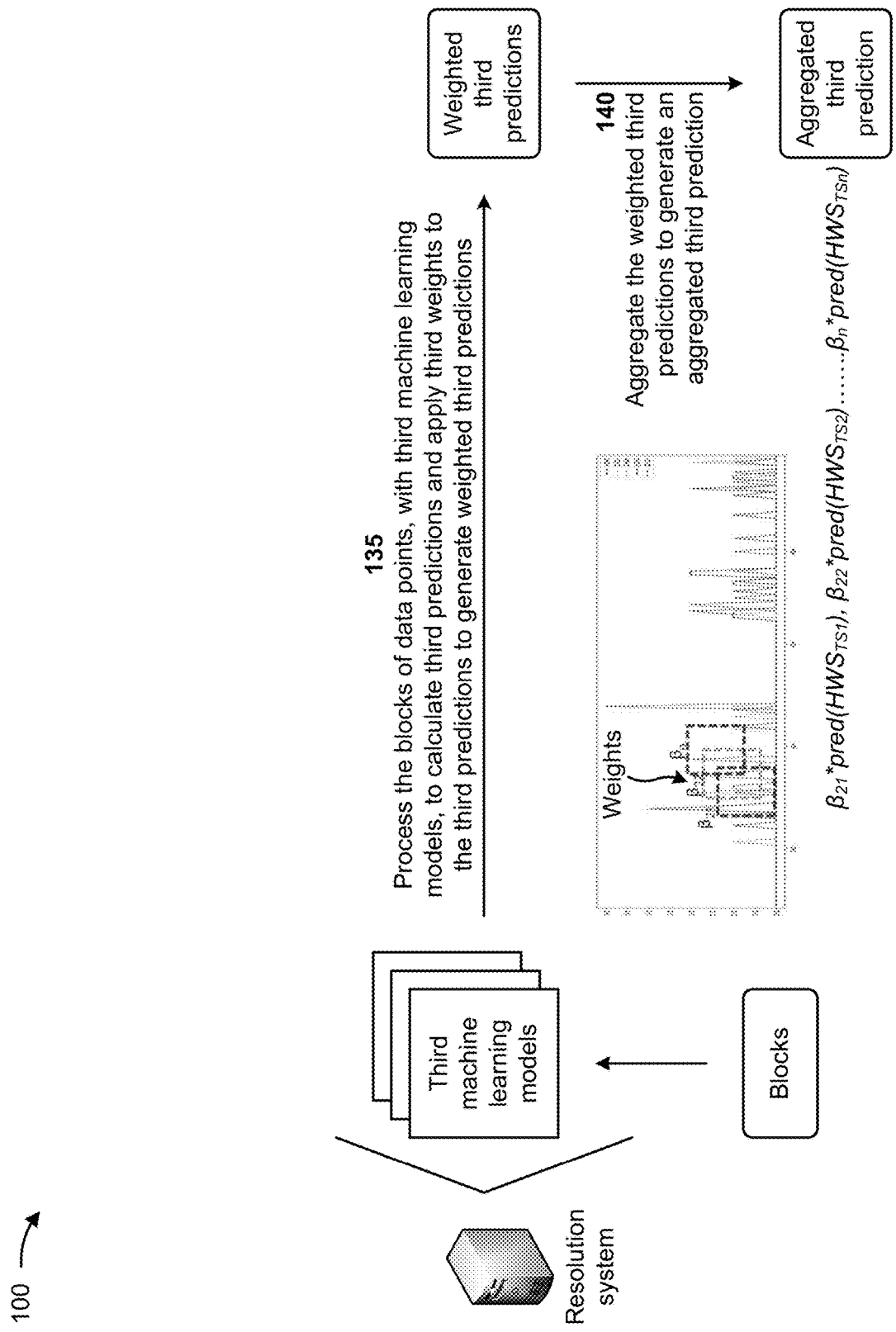

As shown in FIG. 1D, and by reference number 135, the resolution system may process the blocks of data points, with third machine learning models, to calculate third predictions and may apply third weights to the third predictions to generate weighted third predictions. For example, a plurality of third machine learning models (e.g., different from the first machine learning models and the second machine learning models) may be utilized by the resolution system and may process the blocks of data points to calculate the third predictions. For example, if the first machine learning model is ARIMA model and the second machine learning model is a SARIMA model, the third machine learning model may be an HW model. In some implementations, one or more of the third machine learning models may include different prediction capabilities for calculating the third predictions. Each of the third predictions may include a prediction of a future event (e.g., an outage, an alarm, a flag, and/or the like) associated with the system.

When applying the third weights (e.g., $\beta_{21}, \beta_{22}, \beta_{23}, \ldots$ values) to the third predictions (e.g., pred(HW$_1$), pred(HW$_2$), pred(HW$_3$), $\ldots$) to generate the weighted third predictions, the resolution system may multiply the third weights and the third predictions to generate the weighted third predictions as follows:

$$\beta_{21}*\text{pred}(\text{HW}_1), \beta_{22}*\text{pred}(\text{HW}_2), \beta_{23}*\text{pred}(\text{HW}_3),$$

The third weights applied to the third predictions may include different weights that are based on the different prediction capabilities of the third machine learning models. For example, the resolution system may apply a highest third weight to one of the third machine learning models with a highest prediction capability, may apply a next highest third weight to another one of the third machine learning models with a next highest prediction capability, and/or the like, to generate the weighted third predictions. The resolution system may determine the third weights based on statistical measurements of the third machine learning models and/or based on comparing predictions of the third machine learning models with actual events (e.g., outages). In some implementations, when applying the third weights to the third predictions to generate the weighted third predictions, the resolution system may apply the third weights to the third predictions, based on the prediction capabilities of the third machine learning models, to generate the weighted third predictions.

As further shown in FIG. 1D, and by reference number 140, the resolution system may aggregate the weighted third predictions to generate an aggregated third prediction. For example, when aggregating the weighted third predictions (e.g., $\beta_{21}*\text{pred}(\text{HW}_1), \beta_{22}*\text{pred}(\text{HW}_2), \beta_{23}*\text{pred}(\text{HW}_3), \ldots$) to generate the aggregated third prediction (e.g., pred(HW)), the resolution system may add the weighted third predictions together to generate the aggregated third prediction, as follows:

$$\text{pred}(\text{HW})=\Sigma(\beta_{21}*\text{pred}(\text{HW}_1), \beta_{22}*\text{pred}(\text{HW}_2), \beta_{23}*\text{pred}(\text{HW}_3), \ldots).$$

In some implementations, the resolution system may determine an average of the weighted third predictions as the aggregated third prediction. In such implementations, the resolution system may add the weighted third predictions together to generate a value and may divide the value by a quantity of the weighted third predictions to determine the average of the weighted third predictions.

Figure 1E:
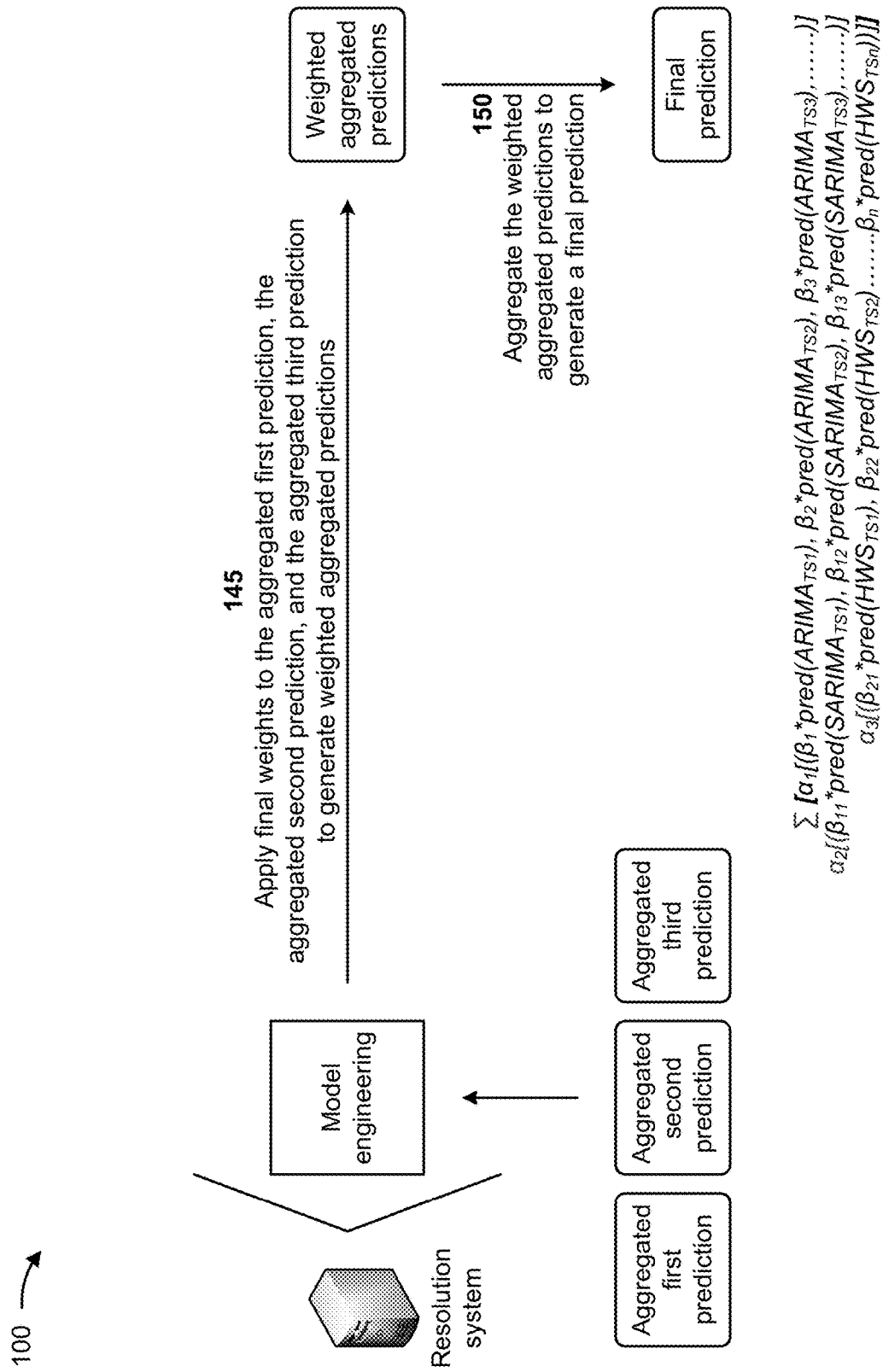

As shown in FIG. 1E, and by reference number 145, the resolution system may apply final weights to the aggregated first prediction, the aggregated second prediction, and the aggregated third prediction to generate weighted aggregated predictions. For example, when applying the final weights (e.g., $\alpha_1, \alpha_2,$ and $\alpha_3$ values) to the aggregated first prediction (e.g., pred(ARIMA)), the aggregated second prediction (e.g., pred(SARIMA)), and the aggregated third prediction (e.g., pred(HW)) to generate the weighted aggregated predictions, the resolution system may multiply the final weights and the aggregated first prediction, the aggregated second prediction, and the aggregated third prediction to generate the weighted aggregated predictions as follows:

$$\alpha_1*\text{pred}(\text{ARIMA}), \alpha_2*\text{pred}(\text{SARIMA}), \alpha_3*\text{pred}(\text{HW}).$$

The final weights applied to the aggregated first prediction, the aggregated second prediction, and the aggregated third prediction may include different weights that are based on different prediction capabilities of the types of machine learning models (e.g., the ARIMA model, the SARIMA model, the HW model, and/or the like). For example, the resolution system may apply a highest final weight to one of the machine learning models with a highest prediction capability relative to the other machine learning models, may apply a next higher final weight to another one of the machine learning models with a next highest prediction capability, and/or the like, to generate the weighted aggregated predictions. The resolution system may determine the final weights based on statistical measurements of the machine learning models and/or based on comparing predictions of the machine learning models with actual events (e.g., outages). In some implementations, when applying the final weights to the aggregated first prediction, the aggregated second prediction, and the aggregated third prediction to generate the weighted aggregated predictions, the resolution system may apply the final weights to the aggregated first prediction, the aggregated second prediction, and the aggregated third prediction based on prediction capabilities of the first machine learning models, the second machine learning models, and the third machine learning models, to generate the weighted aggregated predictions.

As further shown in FIG. 1E, and by reference number 150, the resolution system may aggregate the weighted aggregated predictions to generate a final prediction. For example, when aggregating the weighted aggregated predictions (e.g., $\alpha_1$*pred(ARIMA), $\alpha_2$*pred(SARIMA), $\alpha_3$*pred(HW)) to generate the final prediction (e.g., Final), the resolution system may add the weighted aggregated predictions together to generate the final prediction, as follows:

$$\text{Final}=\Sigma(\alpha_1\text{*pred(ARIMA)}, \alpha_2\text{*pred(SARIMA)}, \alpha_3\text{*pred(HW)}).$$

In some implementations, the resolution system may determine an average of the weighted aggregated predictions as the final prediction. In some implementations, the final prediction may include a prediction of a quantity of outages forecasted for a next time period (e.g., a next day) for one or more infrastructural components of the system.

Figure 1F:
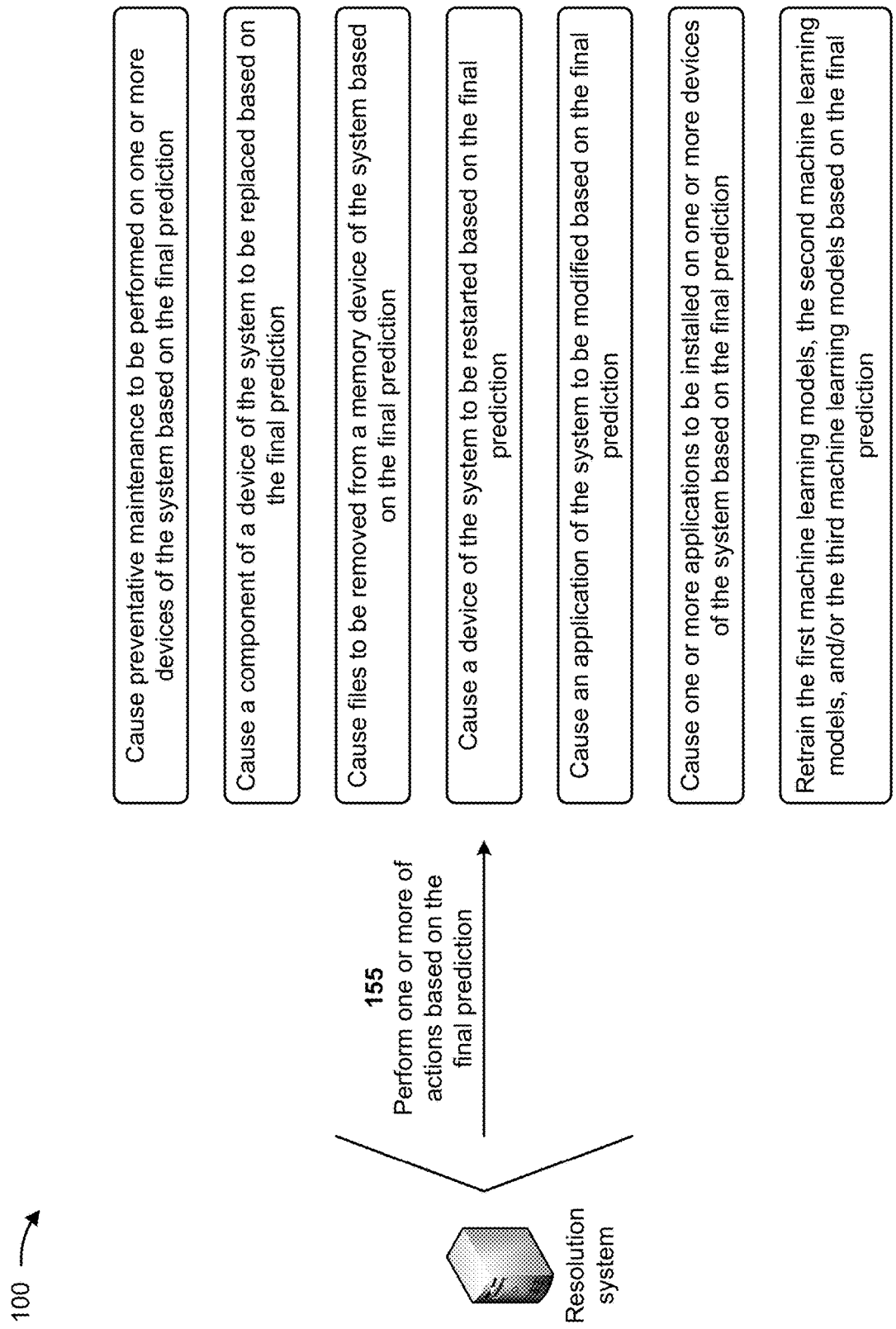

As shown in FIG. 1F, and by reference number 155, the resolution system may perform one or more actions based on the final prediction. In some implementations, performing the one or more actions includes the resolution system causing preventative maintenance to be performed on one or more devices of the system based on the final prediction. For example, the final prediction may indicate that one or more devices or resources of the system may cause a system outage in the future. Based on the final prediction, the resolution system may cause preventative maintenance to be performed on one or more devices by a predefined resolution framework. In this way, the resolution system conserves computing resources, networking resources, and/or the like that would otherwise have been consumed in failing to identify problems associated with the one or more devices, servicing a system failure caused by the one or more devices, failing to provide a product or a service by the system due to the one or more devices, and/or the like.

In some implementations, performing the one or more actions includes the resolution system causing a component of a device of the system to be replaced based on the final prediction. For example, the final prediction may indicate that the component of the device is inoperable and may cause a system outage in the future. Based on the final prediction, the resolution system may cause an order for a new component to be placed and may recommend to replace the component with the new component. In this way, the resolution system conserves computing resources, networking resources, and/or the like that would otherwise have been consumed in failing to identify a problem associated with the component of the device, servicing a system failure caused by the component, failing to provide a product or a service by the system due to the component, and/or the like.

In some implementations, performing the one or more actions includes the resolution system causing files to be removed from a memory device of the system based on the final prediction. For example, the final prediction may indicate that the files of the memory device may cause a system outage in the future. Based the final prediction, the resolution system may cause the files to be removed from the memory device. In this way, the resolution system conserves computing resources, networking resources, and/or the like that would otherwise have been consumed in failing to remove the files from the memory device, servicing a system failure caused by failing to remove the files from the memory device, failing to provide a product or a service by the system due to failing to remove the files from the memory device, and/or the like.

In some implementations, performing the one or more actions includes the resolution system causing a device of the system to be restarted based on the final prediction. For example, the final prediction may indicate that failing to restart the device of the system may cause a system outage in the future. Based the final prediction, the resolution system may cause the device of the system to be restarted. In this way, the resolution system conserves computing resources, networking resources, and/or the like that would otherwise have been consumed in failing to restart the device of the system, servicing a system failure caused by failing to restart the device of the system, failing to provide a product or a service by the system due to failing to restart the device of the system, and/or the like.

In some implementations, performing the one or more actions includes the resolution system causing an application of the system to be modified based on the final prediction. For example, the final prediction may indicate that failing to modify the application of the system may cause a system outage in the future. Based the final prediction, the resolution system may cause the application of the system to be modified. In this way, the resolution system conserves computing resources, networking resources, and/or the like that would otherwise have been consumed in failing to modify the application of the system, servicing a system failure caused by failing to modify the application of the system, failing to provide a product or a service by the system due to failing to modify the application of the system, and/or the like.

In some implementations, performing the one or more actions includes the resolution system causing one or more applications to be installed on one or more devices of the system based on the final prediction. For example, the final prediction may indicate that failing to install the one or more applications on the one or more devices of the system may cause a system outage in the future. Based the final prediction, the resolution system may cause install the one or more applications on the one or more devices of the system. In this way, the resolution system conserves computing resources, networking resources, and/or the like that would otherwise have been consumed in failing to install the one or more applications on the one or more devices of the system, servicing a system failure caused by failing to install the one or more applications on the one or more devices of the system, failing to provide a product or a service by the system due to failing to install the one or more applications on the one or more devices of the system, and/or the like.

In some implementations, performing the one or more actions includes the resolution system retraining the first machine learning models, the second machine learning models, and/or the third machine learning models based on the final prediction. For example, the resolution system may utilize the final prediction as additional training data for retraining the first machine learning models, the second machine learning models, and/or the third machine learning models, thereby increasing the quantity of training data available for training the first machine learning models, the second machine learning models, and/or the third machine learning models. Accordingly, the resolution system may conserve computing resources associated with identifying, obtaining, and/or generating historical data for training the first machine learning models, the second machine learning models, and/or the third machine learning models relative to other systems for identifying, obtaining, and/or generating historical data for training machine learning models.

In this way, the resolution system utilizes machine learning models to predict system events based on time series data generated by a system. The resolution system may resolve system problems (e.g., inevitable outages) by utilizing correlation and machine learning models to recognize (e.g., in real time or near-real time) complex and hidden intercomponent relationships and/or critical events associated with infrastructure components of the system. The resolution system may identify critical events by analyzing different resources and/or infrastructure components of the system, and may forecast and prevent system outages. This, in turn, conserves computing resources, networking resources, and/or the like that would otherwise have been consumed in failing to identify problems associated with complex and hidden intercomponent relationships and/or critical events, servicing system failure caused by the complex and hidden intercomponent relationships and/or the critical events, failing to provide a provide a product or a service by the system due to the complex and hidden intercomponent relationships and/or the critical events, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
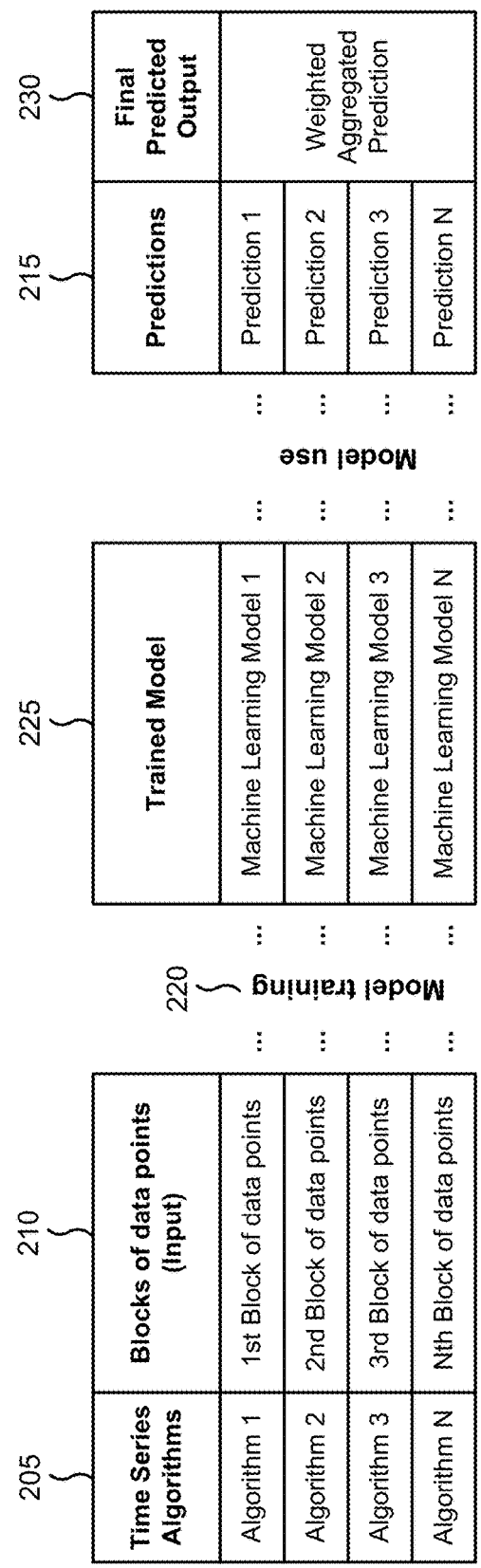
FIG. 2 is a diagram illustrating an example of training and using a machine learning model in connection with predicting system events based on time series data generated by a system.

FIG. 2 is a diagram illustrating an example 200 of training and using a machine learning model (e.g., one of the first machine learning models, the second machine learning models, or the third machine learning models) in connection with predicting system events based on time series data generated by a system. The machine learning model training and usage described herein may be performed using a machine learning system. The machine learning system may include or may be included in a computing device, a server, a cloud computing environment, and/or the like, such as the resolution system described in more detail elsewhere herein.

As shown by reference number 205, a model may be trained using a block of data points. The block of data points may be obtained from historical data, such as data gathered during one or more processes described herein. In some implementations, the machine learning system may receive the block of data points (e.g., as input) from the resolution system, as described elsewhere herein.

As shown by reference number 210, the block of data points is the input. The input may include a set of temporal data points. A specific block may include a set of data points which may correspond to the set of different infrastructural components.

As an example, a first block of data points may be an input to the first machine learning model, a second feature of a second block of data points may be an input to the second machine learning model, a third feature of a third block of data points may be an input to the third machine learning model, and so on. These block of data points used as inputs and values are provided as examples and may differ in other examples.

As shown by reference number 215, the set of observations may be associated with a predicted variable. The predicted variable may represent a variable having a numeric value, may represent a variable having a numeric value that falls within a range of values or has some discrete possible values, may represent a variable that is selectable from one of multiple options, may represent a variable having a Boolean value, and/or the like.

The predicted variable may represent a value that a machine learning model is being trained to predict, and the observation set may represent the block of data points that are input to a trained machine learning model to predict a value for the future. The set of observations may include block of data points so that the machine learning model can be trained to recognize patterns in the data set that lead to a predicted variable.

As shown by reference number 220, the machine learning system may train a machine learning model using the set of observations and using one or more machine learning algorithms, such as a time-series algorithm, a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As an example, as shown by reference number 225, the trained machine learning model 1 may predict a variable prediction 1, the trained machine learning model 2 may predict a variable prediction 2, the trained machine learning model 3 may predict a variable prediction 3 and so on. Based on these predictions, the system may further generate the weighted aggregated predictions, as shown by reference number 230.

In some implementations, the recommendation and/or the automated action associated with the new observation may be based on a predicted variable value (e.g., classification, categorization, and/or the like), may be based on whether a target variable value satisfies one or more thresholds (e.g., whether the predicted variable value is greater than a threshold, is less than a threshold, is equal to a threshold, falls within a range of threshold values, and/or the like).

In this way, the machine learning system may apply a rigorous and automated process to predict system events based on time series data generated by a system. The machine learning system enables recognition and/or identification of tens, hundreds, thousands, or millions of features and/or feature values for tens, hundreds, thousands, or millions of observations, thereby increasing accuracy and consistency and reducing delay associated with predicting system events based on time series data generated by a system relative to requiring computing resources to be allocated for tens, hundreds, or thousands of operators to manually predict system events based on time series data generated by a system.

As indicated above, FIG. 2 is provided as an example. Other examples may differ from what is described in connection with FIG. 2.

Figure 3:
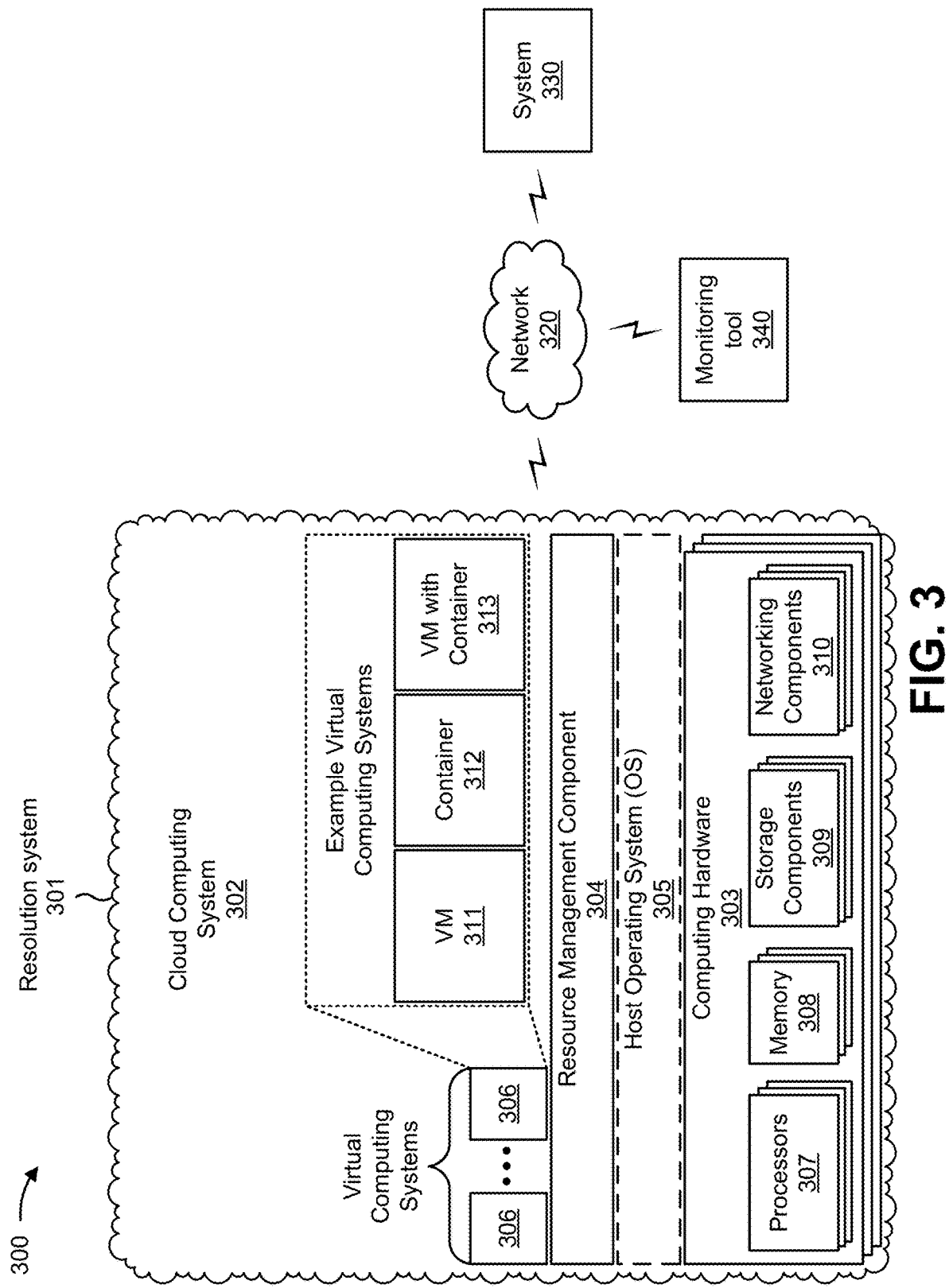
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a resolution system 301, which may include one or more elements of and/or may execute within a cloud computing system 302. The cloud computing system 302 may include one or more elements 303-313, as described in more detail below. As further shown in FIG. 3, the environment 300 may include a network 320, a system 330, and/or a monitoring tool 340. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the resolution system 301 may include one or more elements 303-313 of the cloud computing system 302, may execute within the cloud computing system 302, and/or may be hosted within the cloud computing system 302, in some implementations, the resolution system 301 may not be cloud-based (e.g., may be implemented outside of a cloud computing system) or may be partially cloud-based. For example, the resolution system 301 may include one or more devices that are not part of the cloud computing system 302, such as device 400 of FIG. 4, which may include a stand-alone server or another type of computing device. The resolution system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The system 330 includes one or more devices capable of receiving, generating, storing, processing, providing, and/or routing information, as described elsewhere herein. The system 330 may include a communication device and/or a computing device. For example, the system 330 may include a server, such as an application server, a client server, a web server, a database server, a host server, a proxy server, a virtual server (e.g., executing on computing hardware), or a server in a cloud computing system. In some implementations, the system 330 includes computing hardware used in a cloud computing environment.

The monitoring tool 340 includes one or more devices capable of receiving, generating, storing, processing, providing, and/or routing information, as described elsewhere herein. The monitoring tool 340 may include a communication device and/or a computing device. For example, the monitoring tool 340 may include a server, such as an application server, a client server, a web server, a database server, a host server, a proxy server, a virtual server (e.g., executing on computing hardware), or a server in a cloud computing system. In some implementations, the monitoring tool 340 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
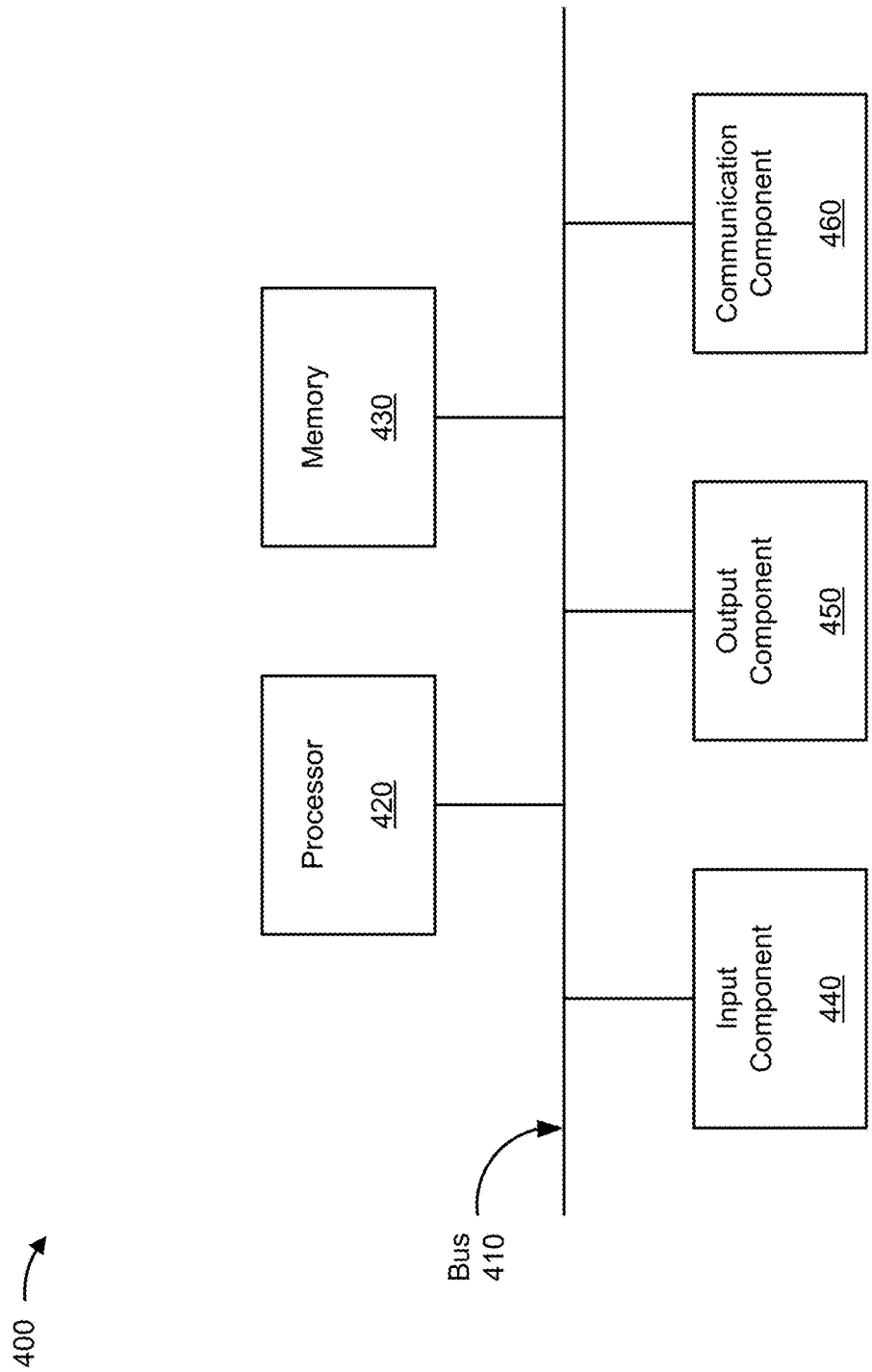
FIG. 4 is a diagram of example components of one or more devices of FIG. 3.

FIG. 4 is a diagram of example components of a device 400, which may correspond to the resolution system 301, the system 330, and/or the monitoring tool 340. In some implementations, the resolution system 301, the system 330, and/or the monitoring tool 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
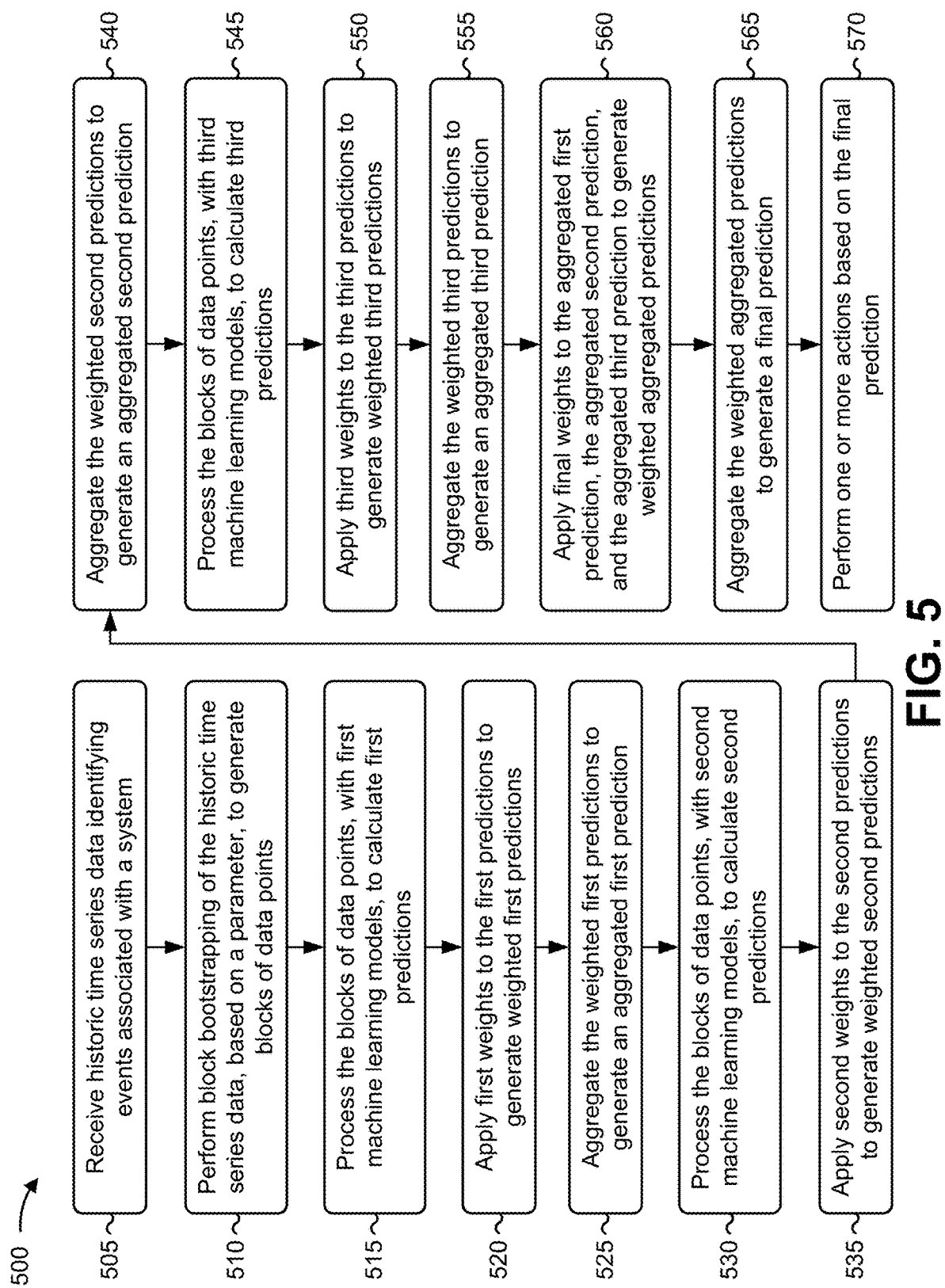
FIG. 5 is a flowchart of an example process for utilizing machine learning models to predict system events based on time series data generated by a system.

FIG. 5 is a flowchart of an example process 500 for utilizing machine learning models to predict system events based on time series data generated by a system. In some implementations, one or more process blocks of FIG. 5 may be performed by a device (e.g., the resolution system 301). In some implementations, one or more process blocks of FIG. 5 may be performed by another device or a group of devices separate from or including the device, such as a system (e.g., the system 330) and/or a monitoring tool (e.g., the monitoring tool 340). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving historic time series data identifying events associated with a system (block 505). For example, the device may receive historic time series data identifying events associated with a system, as described above. In some implementations, the historic temporal data is received from one or more monitoring tools that monitor the system and capture the historic time series data.

As further shown in FIG. 5, process 500 may include performing block bootstrapping of the historic time series data, based on a parameter, to generate blocks of data points of the historic time series data (block 510). For example, the device may perform block bootstrapping of the historic time series data, based on a parameter, to generate blocks of data points of the historic time series data, as described above. In some implementations, the parameter defines a quantity of data points to be included in each of the blocks of data points.

As further shown in FIG. 5, process 500 may include processing the blocks of data points, with first machine learning models, to calculate first predictions (block 515). For example, the device may process the blocks of data points, with first machine learning models, to calculate first predictions, as described above.

As further shown in FIG. 5, process 500 may include applying first weights to the first predictions to generate weighted first predictions (block 520). For example, the device may apply first weights to the first predictions to generate weighted first predictions, as described above. In some implementations, applying the first weights to the first predictions to generate the weighted first predictions includes applying the first weights to the first predictions, based on prediction capabilities of the first machine learning models, to generate the weighted first predictions.

As further shown in FIG. 5, process 500 may include aggregating the weighted first predictions to generate an aggregated first prediction (block 525). For example, the device may aggregate the weighted first predictions to generate an aggregated first prediction, as described above.

As further shown in FIG. 5, process 500 may include processing the blocks of data points, with second machine learning models, to calculate second predictions (block 530). For example, the device may process the blocks of data points, with second machine learning models, to calculate second predictions, as described above.

As further shown in FIG. 5, process 500 may include applying second weights to the second predictions to generate weighted second predictions (block 535). For example, the device may apply second weights to the second predictions to generate weighted second predictions, as described above. In some implementations, applying the second weights to the second predictions to generate the weighted second predictions includes applying the second weights to the second predictions, based on prediction capabilities of the second machine learning models, to generate the weighted second predictions.

As further shown in FIG. 5, process 500 may include aggregating the weighted second predictions to generate an aggregated second prediction (block 540). For example, the device may aggregate the weighted second predictions to generate an aggregated second prediction, as described above.

As further shown in FIG. 5, process 500 may include processing the blocks of data points, with third machine learning models, to calculate third predictions (block 545). For example, the device may process the blocks of data points, with third machine learning models, to calculate third predictions, as described above. In some implementations, each of the first machine learning models includes an ARIMA model, each of the second machine learning models includes SARIMA model, and each of the third machine learning models includes an HW seasonal model.

As further shown in FIG. 5, process 500 may include applying third weights to the third predictions to generate weighted third predictions (block 550). For example, the device may apply third weights to the third predictions to generate weighted third predictions, as described above. In some implementations, applying the third weights to the third predictions to generate the weighted third predictions includes applying the third weights to the third predictions, based on prediction capabilities of the third machine learning models, to generate the weighted third predictions.

As further shown in FIG. 5, process 500 may include aggregating the weighted third predictions to generate an aggregated third prediction (block 555). For example, the device may aggregate the weighted third predictions to generate an aggregated third prediction, as described above.

As further shown in FIG. 5, process 500 may include applying final weights to the aggregated first prediction, the aggregated second prediction, and the aggregated third prediction to generate weighted aggregated predictions (block 560). For example, the device may apply final weights to the aggregated first prediction, the aggregated second prediction, and the aggregated third prediction to generate weighted aggregated predictions, as described above. In some implementations, applying the final weights to the aggregated first prediction and the aggregated second prediction to generate the weighted aggregated predictions includes applying the final weights to the aggregated first prediction and the aggregated second prediction, based on prediction capabilities of the first machine learning models and the second machine learning models, to generate the weighted aggregated predictions.

As further shown in FIG. 5, process 500 may include aggregating the weighted aggregated predictions to generate a final prediction (block 565). For example, the device may aggregate the weighted aggregated predictions to generate a final prediction, as described above. In some implementations, aggregating the weighted aggregated predictions to generate the final prediction includes adding the weighted aggregated predictions together to generate the final prediction.

As further shown in FIG. 5, process 500 may include performing one or more actions based on the final prediction (block 570). For example, the device may perform one or more actions based on the final prediction, as described above. In some implementations, performing the one or more actions includes receiving feedback associated with the final prediction, comparing the feedback and the final prediction, and modifying one or more of the first weights, the second weights, or the final weights based on comparing the feedback and the final prediction. In some implementations, performing the one or more actions includes receiving feedback associated with the final prediction, and modifying the parameter based on the feedback.

In some implementations, performing the one or more actions includes one or more of causing preventative maintenance to be performed on one or more devices of the system based on the final prediction, causing a component of a device of the system to be replaced based on the final prediction, or causing files to be removed from a memory device of the system based on the final prediction.

In some implementations, performing the one or more actions includes one or more of causing a device of the system to be restarted based on the final prediction, causing an application of the system to be modified based on the final prediction, causing one or more applications to be installed on one or more devices of the system based on the final prediction, or retraining one or more of the first machine learning models or the second machine learning models based on the final prediction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, historic time series data identifying events associated with a system;
performing, by the device, block bootstrapping of the historic time series data, based on a parameter, to generate blocks of data points of the historic time series data,
wherein the parameter is modified based on feedback associated with a prediction;
processing, by the device, the blocks of data points, with first machine learning models, to calculate first predictions;
applying, by the device, first weights to the first predictions to generate weighted first predictions;
aggregating, by the device, the weighted first predictions to generate an aggregated first prediction;
processing, by the device, the blocks of data points, with second machine learning models, to calculate second predictions;
applying, by the device, second weights to the second predictions to generate weighted second predictions;
aggregating, by the device, the weighted second predictions to generate an aggregated second prediction;
processing, by the device, the blocks of data points, with third machine learning models, to calculate third predictions;
applying, by the device, third weights to the third predictions to generate weighted third predictions;
aggregating, by the device, the weighted third predictions to generate an aggregated third prediction;
applying, by the device, final weights to the aggregated first prediction, the aggregated second prediction, and the aggregated third prediction to generate weighted aggregated predictions;
aggregating, by the device, the weighted aggregated predictions to generate a final prediction; and
performing, by the device, one or more actions based on the final prediction.

2. The method of claim 1, wherein the historic time series data is received from one or more monitoring tools that monitor the system and capture the historic time series data.

3. The method of claim 1, wherein the parameter defines a quantity of data points to be included in each of the blocks of data points.

4. The method of claim 1, wherein each of the first machine learning models includes an autoregressive integrated moving average (ARIMA) model,
wherein each of the second machine learning models includes a seasonal ARIMA (SARIMA) model, and
wherein each of the third machine learning models includes a Holt-Winters seasonal model.

5. The method of claim 1, wherein applying the first weights to the first predictions to generate the weighted first predictions comprises:
applying the first weights to the first predictions, based on prediction capabilities of the first machine learning models, to generate the weighted first predictions.

6. The method of claim 1, wherein applying the second weights to the second predictions to generate the weighted second predictions comprises:
applying the second weights to the second predictions, based on prediction capabilities of the second machine learning models, to generate the weighted second predictions.

7. The method of claim 1, wherein applying the third weights to the third predictions to generate the weighted third predictions comprises:
applying the third weights to the third predictions, based on prediction capabilities of the third machine learning models, to generate the weighted third predictions.

8. A device, comprising:
one or more memories; and
one or more processors, coupled to the one or more memories, configured to:
perform block bootstrapping of historic time series data associated with a system, based on a parameter, to generate blocks of data points of the historic time series data,
wherein the parameter is modified based on feedback associated with a prediction;
process the blocks of data points, with first machine learning models, to calculate first predictions;
apply first weights to the first predictions to generate weighted first predictions;
aggregate the weighted first predictions to generate an aggregated first prediction;
process the blocks of data points, with second machine learning models, to calculate second predictions;
apply second weights to the second predictions to generate weighted second predictions;
aggregate the weighted second predictions to generate an aggregated second prediction;
apply final weights to the aggregated first prediction and the aggregated second prediction to generate weighted aggregated predictions;
aggregate the weighted aggregated predictions to generate a final prediction; and
perform one or more actions based on the final prediction.

9. The device of claim 8, wherein the one or more processors, to apply the final weights to the aggregated first prediction and the aggregated second prediction to generate the weighted aggregated predictions, are configured to:
apply the final weights to the aggregated first prediction and the aggregated second prediction, based on prediction capabilities of the first machine learning models and the second machine learning models, to generate the weighted aggregated predictions.

10. The device of claim 8, wherein the one or more processors, to perform the one or more actions, are configured to:
receive feedback associated with the final prediction;
compare the feedback associated with the final prediction and the final prediction; and
modify one or more of the first weights, the second weights, or the final weights based on comparing the feedback associated with the final prediction and the final prediction.

11. The device of claim 8, wherein the one or more processors, to perform the one or more actions, are configured to one or more of:
cause preventative maintenance to be performed on one or more devices of the system based on the final prediction;
cause a component of a device of the system to be replaced based on the final prediction; or
cause files to be removed from a memory device of the system based on the final prediction.

12. The device of claim 8, wherein the one or more processors, to perform the one or more actions, are configured to one or more of:
cause a device of the system to be restarted based on the final prediction;
cause an application of the system to be modified based on the final prediction;
cause one or more applications to be installed on one or more devices of the system based on the final prediction; or
retrain one or more of the first machine learning models or the second machine learning models based on the final prediction.

13. The device of claim 8, wherein the one or more processors, to aggregate the weighted aggregated predictions to generate the final prediction, are configured to:
add the weighted aggregated predictions together to generate the final prediction.

14. The device of claim 8, wherein the one or more processors, to perform the one or more actions, are configured to:
receive feedback associated with the final prediction; and
modify the parameter based on the feedback associated with the final prediction.

15. A non-transitory computer-readable medium storing a set of instructions, the set of instructions comprising:
one or more instructions that, when executed by one or more processors of a device, cause the device to:
receive historic time series data identifying events associated with a system;
perform block bootstrapping of the historic time series data, based on a parameter, to generate blocks of data points of the historic time series data,
wherein the parameter defines a quantity of data points to be included in each of the blocks of data points, and
wherein the parameter is modified based on feedback associated with a prediction;
process the blocks of data points, with first machine learning models, to calculate first predictions;
apply first weights to the first predictions to generate weighted first predictions;
aggregate the weighted first predictions to generate an aggregated first prediction;
process the blocks of data points, with second machine learning models, to calculate second predictions;
apply second weights to the second predictions to generate weighted second predictions;
aggregate the weighted second predictions to generate an aggregated second prediction;
process the blocks of data points, with third machine learning models, to calculate third predictions;
apply third weights to the third predictions to generate weighted third predictions;
aggregate the weighted third predictions to generate an aggregated third prediction;
apply final weights to the aggregated first prediction, the aggregated second prediction, and the aggregated third prediction to generate weighted aggregated predictions;
aggregate the weighted aggregated predictions to generate a final prediction; and
perform one or more actions based on the final prediction.

16. The non-transitory computer-readable medium of claim 15, wherein the one or more instructions, that cause the device to apply the first weights to the first predictions to generate the weighted first predictions, cause the device to:
apply the first weights to the first predictions, based on prediction capabilities of the first machine learning models, to generate the weighted first predictions.

17. The non-transitory computer-readable medium of claim 15, wherein the one or more instructions, that cause the device to apply the second weights to the second predictions to generate the weighted second predictions, cause the device to:
apply the second weights to the second predictions, based on prediction capabilities of the second machine learning models, to generate the weighted second predictions.

18. The non-transitory computer-readable medium of claim 15, wherein the one or more instructions, that cause the device to apply the third weights to the third predictions to generate the weighted third predictions, cause the device to:
apply the third weights to the third predictions, based on prediction capabilities of the third machine learning models, to generate the weighted third predictions.

19. The non-transitory computer-readable medium of claim 15, wherein the one or more instructions, that cause the device to apply the final weights to the aggregated first prediction, the aggregated second prediction, and the aggregated third prediction to generate the weighted aggregated predictions, cause the device to:
apply the final weights to the aggregated first prediction, the aggregated second prediction, and the aggregated third prediction, based on prediction capabilities of the first machine learning models, the second machine learning models, and the third machine learning models, to generate the weighted aggregated predictions.

20. The non-transitory computer-readable medium of claim 15, wherein the one or more instructions, that cause the device to perform the one or more actions, cause the device to one or more of:
cause preventative maintenance to be performed on one or more devices of the system based on the final prediction;
cause a component of a device of the system to be replaced based on the final prediction;
cause files to be removed from a memory device of the system based on the final prediction;
cause a device of the system to be restarted based on the final prediction;
cause an application of the system to be modified based on the final prediction;
cause one or more applications to be installed on one or more devices of the system based on the final prediction; or
retrain one or more of the first machine learning models, the second machine learning models, or the third machine learning models based on the final prediction.

* * * * *